US011713009B2

(12) United States Patent
Kurata et al.

(10) Patent No.: US 11,713,009 B2
(45) Date of Patent: Aug. 1, 2023

(54) ELECTRIC JUNCTION BOX

(71) Applicant: Yazaki Corporation, Tokyo (JP)

(72) Inventors: Sho Kurata, Makinohara (JP); Hideki Kawamura, Makinohara (JP); Minoru Umezaki, Makinohara (JP); Toshiki Yagi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 410 days.

(21) Appl. No.: 17/017,142

(22) Filed: Sep. 10, 2020

(65) Prior Publication Data

US 2021/0078513 A1 Mar. 18, 2021

(30) Foreign Application Priority Data

Sep. 13, 2019 (JP) .................................. 2019-167286

(51) Int. Cl.
*B60R 16/023* (2006.01)
*H02G 3/08* (2006.01)
*H02G 3/14* (2006.01)

(52) U.S. Cl.
CPC ......... *B60R 16/0238* (2013.01); *H02G 3/081* (2013.01); *H02G 3/14* (2013.01)

(58) Field of Classification Search
CPC ........ Y02B 10/10; H05K 5/0217; H05K 5/03; B60R 16/0215; B60R 16/0238; H02G 3/14; H02G 3/081
See application file for complete search history.

(56) References Cited

U.S. PATENT DOCUMENTS

| 7,748,756 | B2 | 7/2010 | Kanamaru et al. |
| 9,203,221 | B2 * | 12/2015 | Kamigaichi ........... H02G 3/086 |
| 10,333,287 | B2 | 6/2019 | Nakashima et al. |
| 2008/0209961 | A1 | 9/2008 | Kanamaru et al. |
| 2014/0126115 | A1 | 5/2014 | Kamigaichi |
| 2014/0246216 | A1 | 9/2014 | Kakimi et al. |
| 2019/0123537 | A1 | 4/2019 | Nakashima et al. |

FOREIGN PATENT DOCUMENTS

| CN | 103444033 A | 12/2013 | |
| JP | 2005-065421 A | 3/2005 | |
| JP | 2005-269862 A | 9/2005 | |
| JP | 3833495 B2 * | 10/2006 | ......... B60R 16/0238 |
| JP | 2008-167536 A | 7/2008 | |
| JP | 2014-171317 A | 9/2014 | |
| JP | 2019-080397 A | 5/2019 | |
| JP | 2019110700 A * | 7/2019 | |

* cited by examiner

Primary Examiner — Jean F Duverne
(74) Attorney, Agent, or Firm — Banner & Witcoff, Ltd.

(57) ABSTRACT

An electric junction box includes a housing configured to accommodate an electronic component and a lid configured to be attached to the housing to cover an opening of the housing. The housing includes a housing body configured to accommodate the electronic component, and a partition wall dividing an inner space of the housing body. The partition wall is provided with a jig pin hole extending along a direction in which the lid is attached to the housing, the jig pin hole being configured such that a pin provided on a workbench is to be inserted into the jig pin hole making the housing fixed to the workbench on which another component is to be attached to the housing.

7 Claims, 6 Drawing Sheets

ELECTRIC JUNCTION BOX

CROSS-REFERENCE TO RELATED APPLICATION

The present application claims priority to Japanese Patent Application No. 2019-167286 filed on Sep. 13, 2019, the entire content of which is incorporated herein by reference.

TECHNICAL FIELD

The present invention relates to an electric junction box such as a fuse box or a junction box.

BACKGROUND

A related art electric junction box includes a block to which an electronic component such as a fuse is assembled, a housing that accommodates the block, and a lid portion that covers an opening of the housing (see, for example, JP2014-171317A, JP2008-167536A, and JP2019-80397A). When such an electric junction box is produced, a housing is placed on a workbench, and a block and a lid portion are assembled. Therefore, it is required to fix the housing to the workbench.

SUMMARY

Illustrative aspects of the present invention provide an electric junction box whose housing can be fixed to a workbench easily.

According to an illustrative aspect of the present invention, an electric junction box includes a housing configured to accommodate an electronic component and a lid configured to be attached to the housing to cover an opening of the housing. The housing includes a housing body configured to accommodate the electronic component, and a partition wall dividing an inner space of the housing body. The partition wall is provided with a jig pin hole extending along a direction in which the lid is attached to the housing, the jig pin hole being configured such that a pin provided on a workbench is to be inserted into the jig pin hole making the housing fixed to the workbench on which another component is to be attached to the housing.

Other aspects and advantages of the invention will be apparent from the following description, the drawings and the claims.

DESCRIPTION OF EMBODIMENTS

An electric junction box 1 according to the present embodiment is to be mounted on, for example, a vehicle and is to be put between a power source (secondary battery) of a vehicle not illustrated and an electronic device on the vehicle to adjust electric power supplied from the power source to the electronic device. The electric junction box 1 may also be referred to as a relay box, a fuse box, a junction box, or the like.

Figure 1:
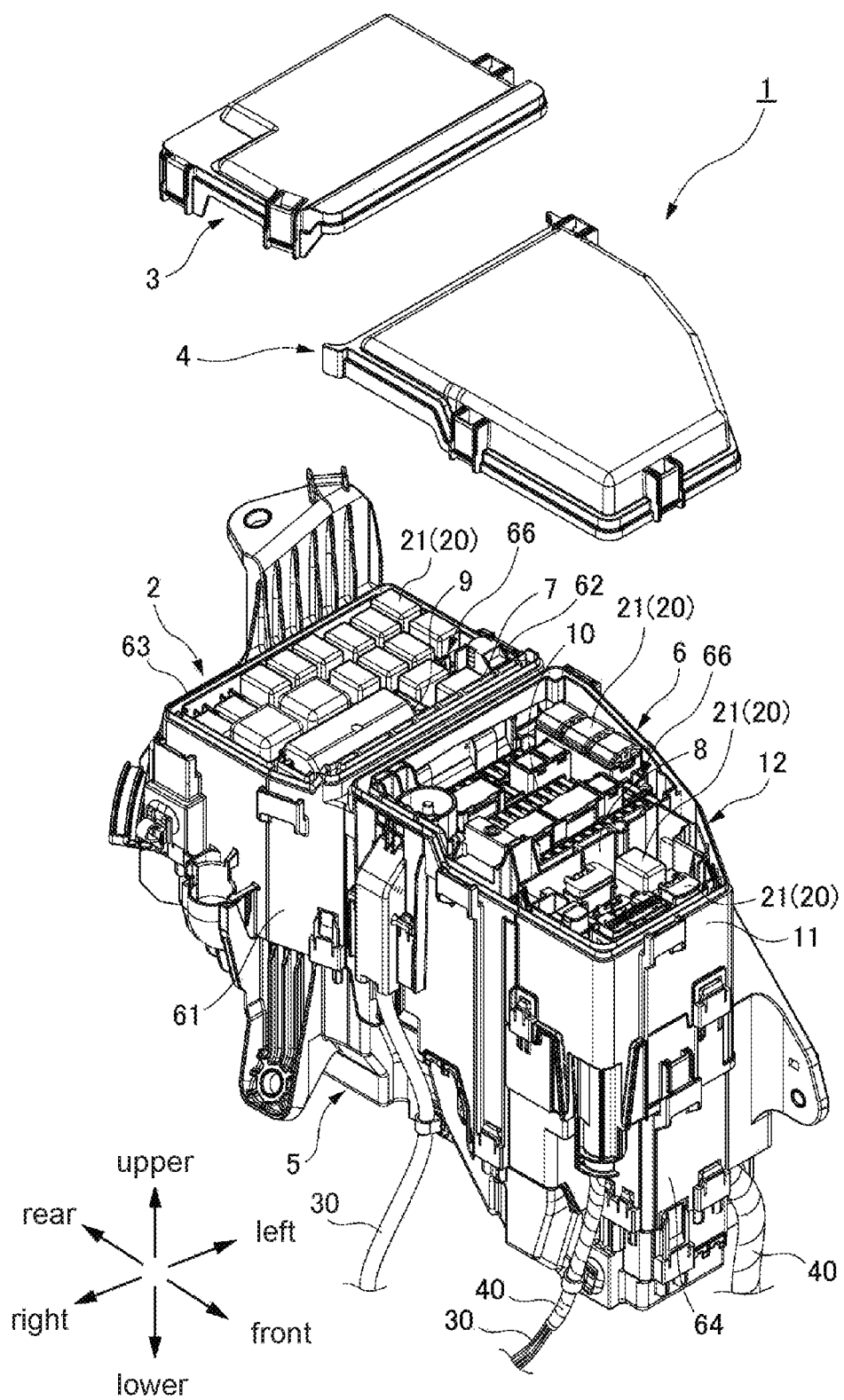
FIG. 1 is an exploded perspective view of an electric junction box according to the present embodiment, which is in a state where upper covers of the electric junction box are removed.

As illustrated in FIG. 1, the electric junction box 1 according to the present embodiment accommodates electronic components 20 and electric wires 30 connected to the electronic components 20. The electric junction box 1 is to be disposed in an engine room provided on a front side of a vehicle. The electronic components 20 are, for example, a relay, a fuse, a fusible link, or the like. The electronic component 20 includes an electronic component body (not illustrated) such as a relay body or a fuse body disposed inside a housing 21, and a plurality of terminals (not illustrated) serving as electric connection portions which are electrically connected to the electronic component body. The electric wires 30 are electrically connected to the terminals of the electronic components 20.

The electric wire 30 is electrically connected to a terminal of the electronic component 20 at one end thereof. The other end thereof is electrically connected to the power source (secondary battery) or the electronic device. The electric wire 30 is electrically connected to the terminal of the electronic component 20 via a mating terminal (not illustrated). A plurality of the electric wires 30 drawn out from the electric junction box 1 are bundled together by an exterior material 40 such as an adhesive tape or a corrugated tube.

Figure 2:
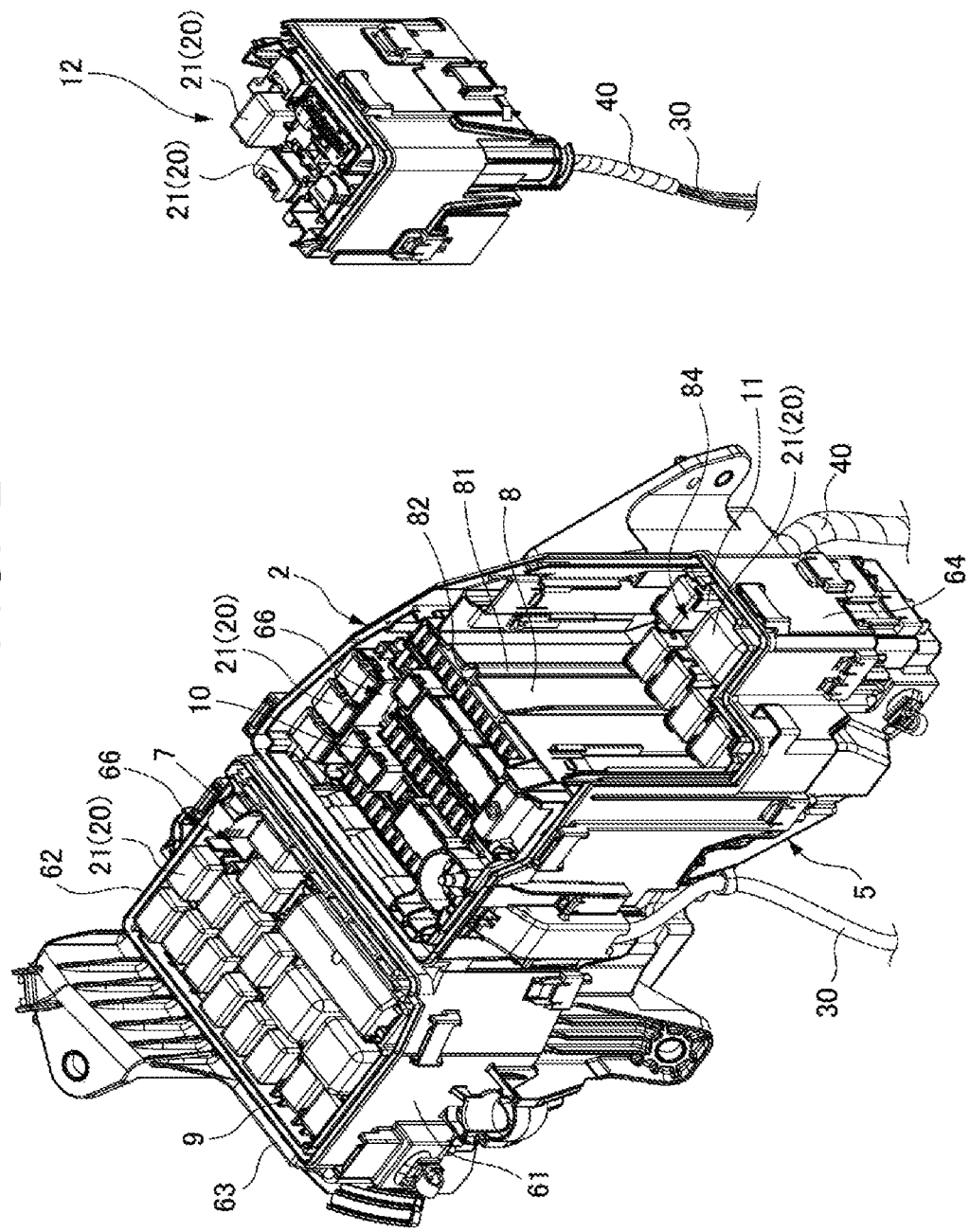
FIG. 2 is an exploded perspective view of the electric junction box illustrated in FIG. 1, which is in a state where a fitting component is removed from the electric junction box.
Figure 3:
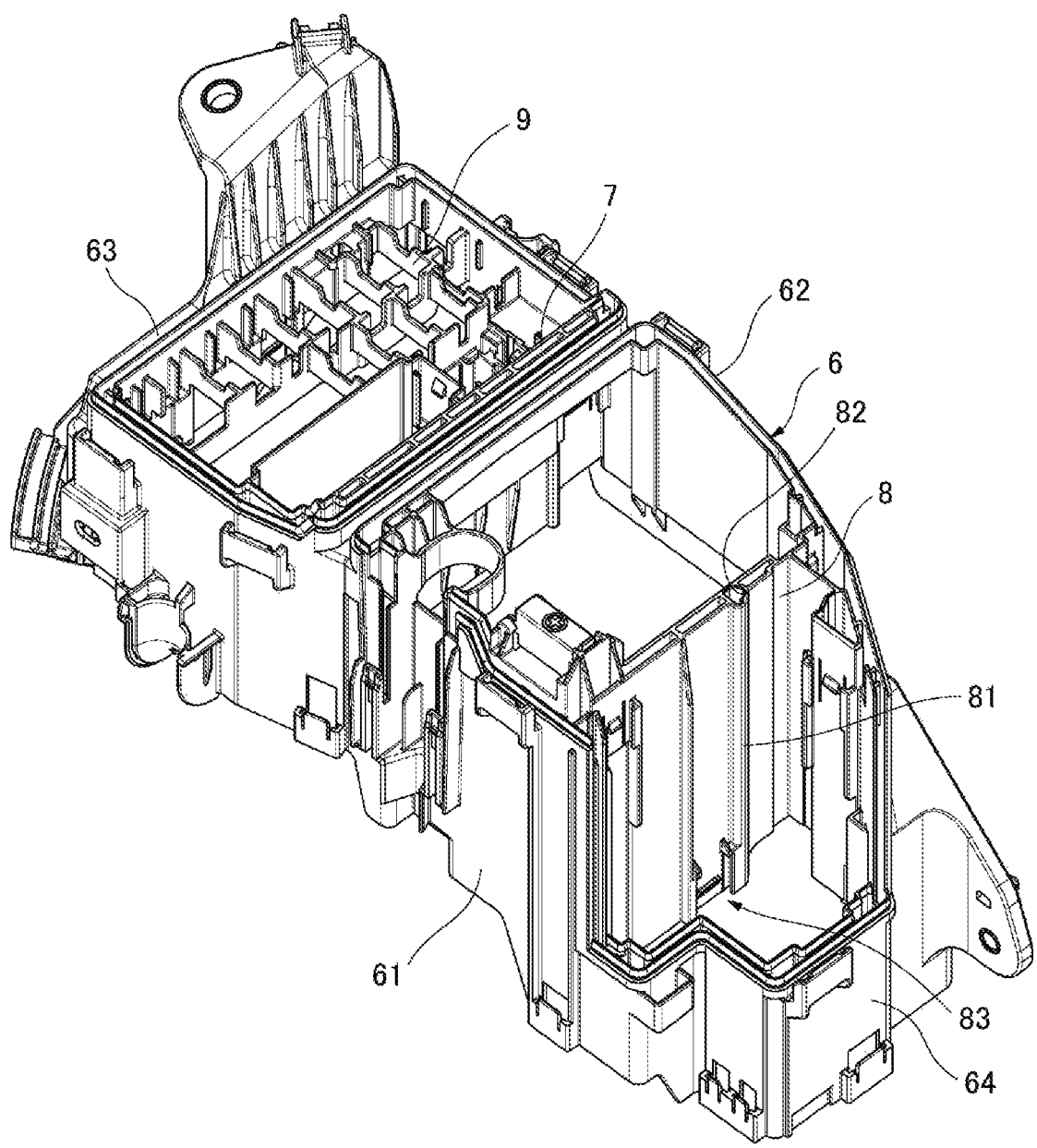
FIG. 3 is a perspective view of a housing body and partition walls of the electric junction box illustrated in FIG. 1.
Figure 5:
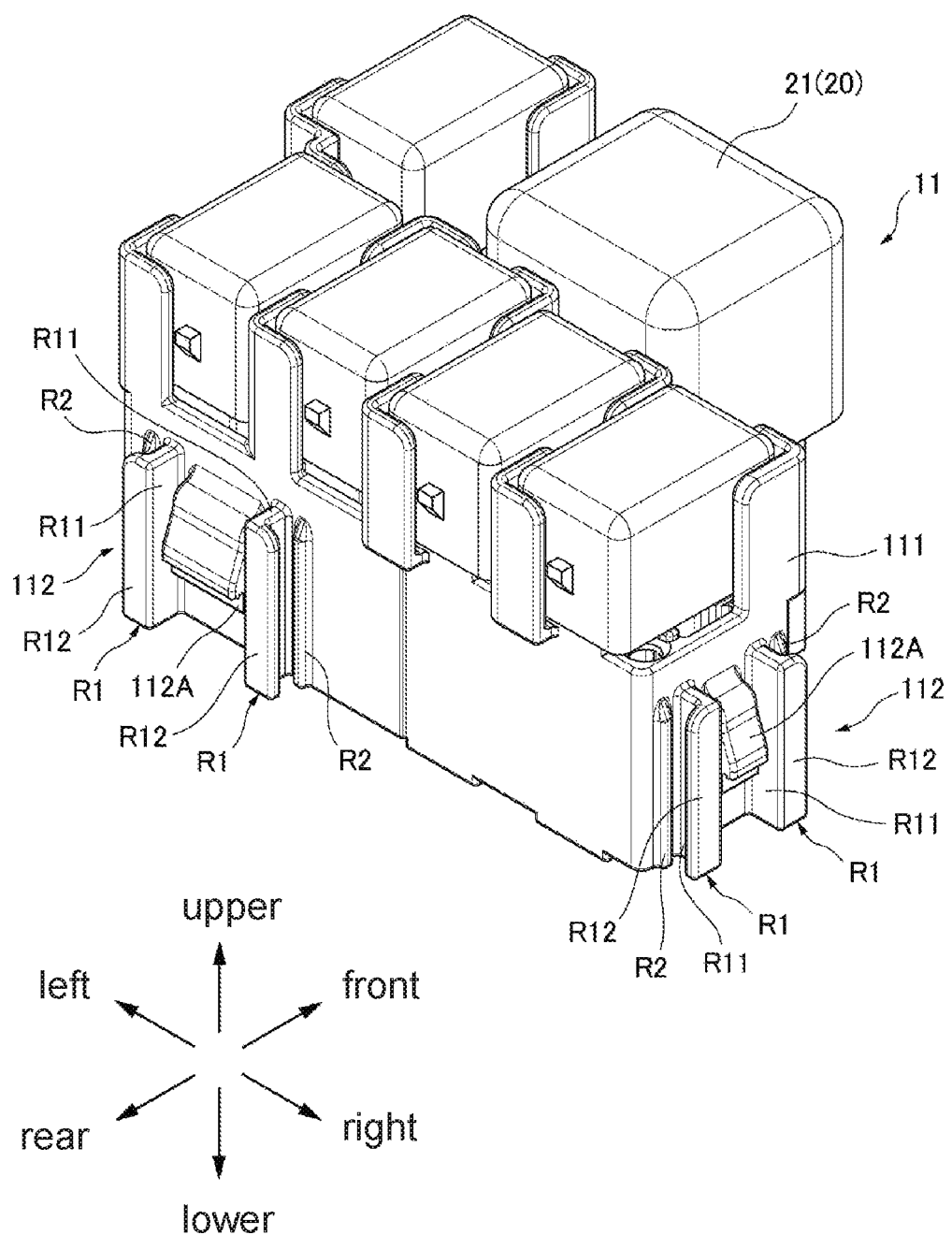
FIG. 5 is a perspective view of a block of the electric junction box illustrated in FIG. 2, to which electronic components are assembled.

As illustrated in FIG. 1, the electric junction box 1 includes a housing 2, a first upper cover 3, a second upper cover 4, and a lower cover 5 (lids 3 to 5). As illustrated in FIGS. 1 to 3, the housing 2 includes a housing body 6, partition walls 7, 8 which partition off the inside of the housing body 6, a plurality of blocks 9 to 11 (the block 11 is illustrated in FIG. 5) accommodated in the housing body 6, and a fitting component 12 to be fitted to and held by the housing body 6.

The housing body 6 is formed in a square cylindrical shape. The housing body 6 has openings 66, each having a substantially rectangular shape. The openings 66 provided on one side in a lengthwise direction (axial direction) of the cylindrical shape of the housing body 6 are closed by two upper covers of the first upper cover 3 and the second upper cover 4. An opening (not illustrated) on the other side of the housing body 6 is closed by one lower cover 5. The lengthwise direction of the square cylindrical shape of the above housing body 6 is arranged along an upper-lower direction of the vehicle such that the openings 66 closed by the first and second upper covers 3, 4 are directed upward, and an opening 67 closed by the lower cover 5 is directed downward. In addition, the housing body 6 is disposed such that a longitudinal direction of the substantially rectangular openings 66 is along a front-rear direction of the vehicle, and a lateral direction is along a left-right direction of the vehicle.

The housing body 6 includes first and second side walls 61, 62 disposed along the front-rear direction, and third and fourth side walls 63, 64 disposed along the left-right direction. The third side wall 63 is connected to rear ends of the first and second side walls 61, 62, and the fourth side wall 64 is connected to front ends of the first and second side walls 61 and 62 such that the housing body 6 is formed in the square cylindrical shape. Lower ends of the first and second side walls 61, 62 include a plurality of steps, and therefore are formed in a staircase shape such that the height of each step of the staircase shape decreases towards the rear side of the housing 2.

The partition wall 7 extends along a direction perpendicular to the front-rear direction of the housing body 6. Two ends of the partition wall 7 in the left-right direction are respectively connected to the first and second side walls 61 and 62 of the housing body 6. That is, the partition wall 7 divides an inner space of the housing body 6 into two sections arranged in the front-rear direction side by side. The two sections include a front section provided on a front side of the housing body 6 in the front-rear direction and a rear section provided on a rear side thereof. In the present embodiment, the front section serves as a user maintenance area, and the rear section serves as a dealer maintenance area. The user maintenance area accommodates electronic components 20 which are to be maintained (repaired) by a user. The dealer maintenance area accommodates electronic components 20 which are maintained (repaired) by a dealer. The opening 66 of the dealer maintenance area is to be covered by the first upper cover 3, and the opening 66 of the user maintenance area is to be covered by the second upper cover 4.

The partition wall 8 extends along the direction perpendicular to the front-rear direction. The partition wall 8 is disposed inside the user maintenance area of the housing body 6. Two ends of the partition wall 8 in the left-right direction are respectively connected to the first and second side walls 61, 62 of the housing body 6. That is, the partition wall 8 divides the user maintenance area into two sections arranged in the front-rear direction side by side. A notch 84, which can be obtained by cutting out an upper end of the first side wall 61 on a front side than the partition wall 8 in the front-rear direction and cutting out an upper end of the fourth side wall 64, is provided. In other words, the height of the first side wall 61 on the front side than the partition wall 8 and the fourth side wall 64 in the upper-lower direction is smaller than the height of the first side wall 61 on a rear side than the partition wall 8.

The partition wall 8 is provided with a protruding portion 81 which protrudes from both sides of the partition wall 8 in a thickness direction (i.e., the front-rear direction) and extends in the upper-lower direction. The protruding portion 81 is provided from an upper end of the partition wall 8 to a lower end thereof. In the protruding portion 81, a jig pin hole 82 running in the upper-lower direction, i.e., a direction in which the first and third upper covers 3, 4 are to be attached to the housing body 6 (or to the housing 2), is formed. The jig pin hole 82 is a hole for fixing the housing 2 to the workbench by allowing a pin provided on the workbench to go into the jig pin hole 82. The jig pin hole 82 does not have a perfect circle shape; a pin provided on the workbench has the same shape as the jig pin hole 82 and the pin is to be inserted into the jig pin hole 82. As a result, the housing body 6 does not rotate about the pin. The partition wall 8 is provided with a wall-side locking portion 83 (locking portion) to be engaged with the block 11, which will be described below in FIGS. 3 and 4. The wall-side locking portion 83 will be described below.

As illustrated in FIG. 2, blocks 9 to 11 are provided with accommodation chambers for accommodating and holding a plurality of electronic components 20. The blocks 9 to 11 accommodate and hold the electronic component 20 such that the housing 21 of the electronic component 20 is directed upward, and the terminal portion is directed downward. In the present embodiment, the blocks 9 to 11 are respectively disposed in the dealer maintenance area which is located to the rear of the partition wall 7, a section of the user maintenance area which is in front of the partition wall 7 and to the rear of the partition wall 8, and the other section of the user maintenance area which is in the front of the partition wall 8, respectively. In the present embodiment, as illustrated in FIG. 3, the block 9 in the dealer maintenance area is fixed integrally with the housing body 6. The blocks 10 and 11 in the user maintenance area are detachably attached to the housing body 6. As illustrated in FIG. 2, the block 11, which is disposed in the section more toward the front than the partition wall 8, is disposed below the notch 84.

As illustrated in FIG. 5, the block 11 is provided with a block body 111 for accommodating and holding the plurality of electronic components 20, and block-side locking portions 112 to be locked to the housing body 6. In the present embodiment, the block 11 is provided with three block-side locking portions 112 to be locked to the first and fourth side walls 61, 64, and the partition wall 8. The block-side locking portions 112 protrude from outer surfaces of the block body 111, which respectively face the first and fourth side walls 61, 64 and the partition wall 8. Each of the block-side locking portions 112 includes a pair of first ribs R1, R1, a pair of second ribs R2, R2, and a locking arm 112A.

A pair of first ribs R1, R1 are provided on the block 11 and spaced apart from each other in a direction perpendicular to the upper-lower direction. The pair of first ribs R1, R1 extend in the upper-lower direction. More specifically, a pair of first ribs R1, R1 of the block-side locking portion 112 to be locked to (to be engaged with) the first side wall 61 are spaced apart from each other in the front-rear direction. A pair of first ribs R1, R1 of each of the block-side locking portions 112 to be respectively locked to the fourth side wall 64 and the partition wall 8 are spaced apart from each other in the left-right direction. The locking arm 112A described below is positioned between the pair of first ribs R1, R1. The first rib R1 includes a first rib portion R11 protruding from the block body 111, and a second rib portion R12 protruding from a distal end of the first rib portion R11 and extending toward a side on which the locking arm 112A is not provided, i.e., the second rib portion R12 protrudes from the distal end of the first rib portion R11 and extends away from the locking arm 112A.

A pair of second ribs R2, R2 are provided on the block 11 and spaced apart from each other in a direction perpendicular to the upper-lower direction. The pair of second ribs R2, R2 extend in the upper-lower direction. To describe in detail, a pair of second ribs R2, R2 of the block-side locking portion 112 to be locked to the first side wall 61 are spaced apart from each other in the front-rear direction, and a pair of second ribs R2, R2 of each of the block-side locking portions 112 to be respectively locked to the fourth side wall 64 and the partition wall 8 are spaced apart from each other in the left-right direction. The pair of first ribs R1, R1 are positioned between the pair of second ribs R2, R2. The protruding amount of the second rib R2 is smaller than that of the first rib portion R11. The locking arm 112A extends in the upper-lower direction. An upper end of the locking arm 112A is supported by the block body 111, and a lower end thereof is formed in a cantilever shape serving as a free end.

Figure 4:
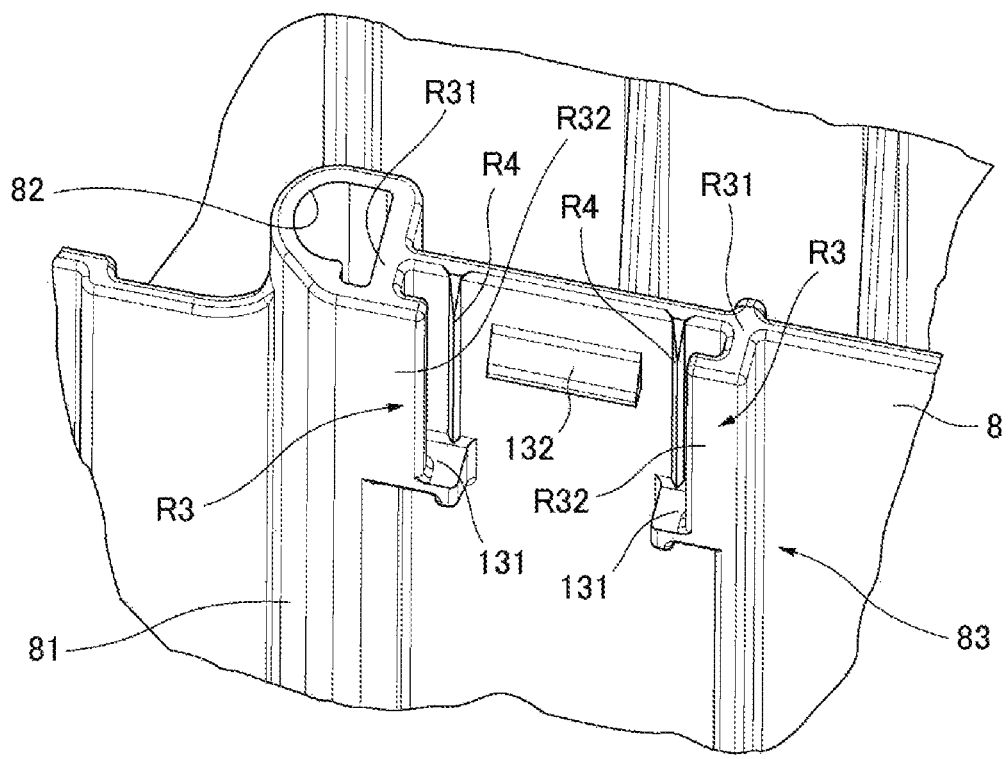
FIG. 4 is a partially enlarged view of a periphery of the partition walls of the electric junction box illustrated in FIG. 1.

As illustrated in FIG. 4, the wall-side locking portions 83 to be locked with the block-side locking portions 112 provided on the block 11 are provided on the first and fourth side walls 61, 64, and the partition wall 8, respectively. Each of the wall-side locking portions 83 includes a pair of third ribs R3, R3, a pair of fourth ribs R4, R4, a pair of locking walls 131, 131, and a locking protrusion 132.

The pair of third ribs R3, R3 are provided on each of the first and fourth side walls 61, 64, and the partition wall 8 and spaced apart from each other in a direction perpendicular to the upper-lower direction. The pair of third ribs R3, R3 extend in the upper-lower direction. More specifically, a pair of third ribs R3, R3 provided on the first side wall 61 are spaced apart from each other in the front-rear direction, and a pair of third ribs R3, R3 provided on each of the fourth side wall 64 and the partition wall 8 are spaced apart from each other in the left-right direction. The locking protrusion 132 described below is positioned between the pair of third ribs R3, R3. The third rib R3 includes a third rib portion R31 protruding from each of the first and fourth side walls 61, 64, and the partition wall 8, and a fourth rib portion R32 protruding from a distal end of the third rib portion R31 and extending toward the locking protrusion 132. According to the present embodiment, a third rib portion R31 on one side (left side in the present embodiment) of the pair of third ribs R3, R3 of the wall-side locking portion 83 provided on the partition wall 8 is formed as a part of the protruding portion 81 in which the jig pin hole 82 is provided, i.e., the third rib portion R31 on the one side is provided integrally with the protruding portion 81.

The pair of fourth ribs R4, R4 are provided on each of the first and fourth side walls 61, 64 and the partition wall 8, and are spaced apart from each other in a direction perpendicular to the upper-lower direction. The pair of fourth ribs R4, R4 extend in the upper-lower direction. More specifically, a pair of fourth ribs R4, R4 provided on the first side wall 61 are spaced apart from each other in the front-rear direction, and a pair of fourth ribs R4, R4 provided on each of the fourth side wall 64 and the partition wall 8 are spaced apart from each other in the left-right direction. The pair of fourth ribs R4, R4 are positioned between the pair of third ribs R3, R3. The protruding amount of the fourth rib R4 is smaller than that of the third rib portion R31. The locking wall 131 protrudes from the third rib portion R31 toward the locking protrusion 132. The locking wall 131 is connected to the first and fourth side walls 61, 64, the partition wall 8 and the fourth rib portion R32. The locking protrusion 132 protrudes from the first and fourth side walls 61, 64 and the partition wall 8 and is provided between the pair of fourth ribs R4, R4.

Figure 6:
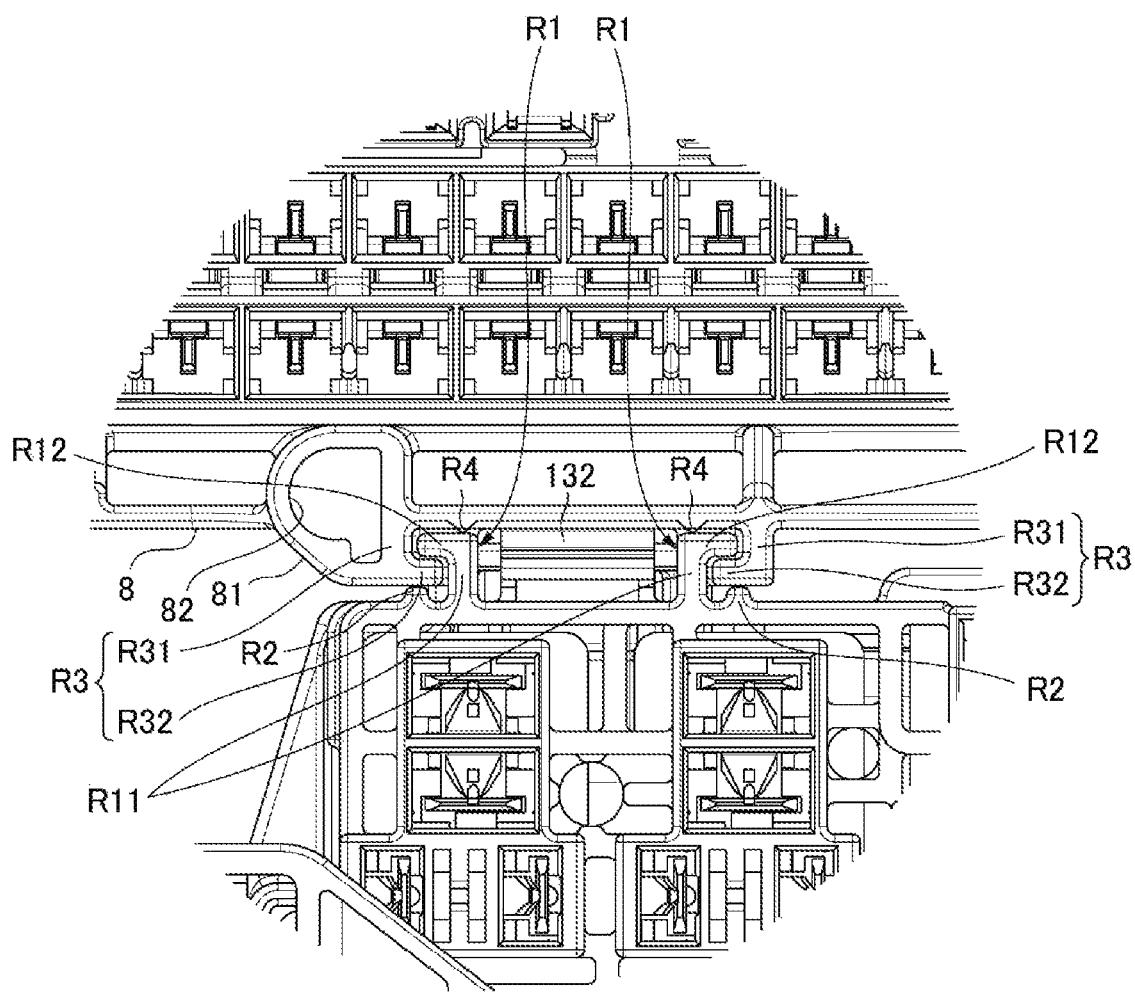
FIG. 6 is a partial bottom view of the electric junction box illustrated in FIG. 1 which is in a state where a lower cover is removed from the electric junction box.

Next, an assembly procedure of the block 11 and the housing body 6 will be described. The block 11 is inserted from the lower opening of the housing body 6. At this time, as illustrated in FIG. 6, the pair of first ribs R1, R1 provided on the block 11 are inserted between the pair of third ribs R3, R3 provided on the partition wall 8. The second rib portion R12 provided on the block 11 is inserted between the fourth rib R4 and the fourth rib portion R32 provided on the partition wall 8, and the third rib portion R31 provided on the partition wall 8 is inserted between the second rib R2 and the second rib portion R12 provided on the block 11. As a result, the block 11 is locked in the front-rear direction and the left-right direction relative to the partition wall 8.

The first and second ribs R1, R2 provided on the block 11 slide along the third and fourth ribs R3, R4 provided on the partition wall 8 in a manner that the slide of the block 11 in the upper-lower direction is guided. The locking arm 112A contacts the locking protrusion 132 provided on the partition wall 8 by sliding the block 11 upward. When the block 11 is slid upward further, the locking arm 112A deforms and gets on the locking protrusion 132. When the block 11 is slid upward yet further, a distal end (free end) of the locking arm 112A slides on and gets over the locking protrusion 132 to be positioned above the locking protrusion 132, and the locking arm 112A is restored. As a result, the locking protrusion 132 and the distal end of the locking arm 112A are locked with each other. At this time, an upper end of the first rib R1 provided on the block 11 abuts against the locking wall 131 and thereby is locked. As a result, the block 11 is locked in the upper-lower direction relative to the partition wall 8.

Next, the fitting component 12 will be described. Electronic components 20 and electric wires 30, which is to be electrically connected to the electronic components 20, are attached to the fitting component 12. The fitting component 12 is to be accommodated in an area defined by the notch 84 provided on the housing body 6 the partition wall 8, the first side wall 61, and the second side wall 62, and is fitted to and held by the housing body 6. The fitting component 12 is disposed above the block 11, which is disposed in the area frontward than the partition wall 8.

According to the embodiment described above, the partition wall 8 of the housing 2 is provided with the jig pin hole 82 which runs in the upper-lower direction that is a direction in which the first and second upper covers 3, 4 and the lower cover 5 are to be attached to the housing body 6, and into which the pin for fixing the housing 2 to the workbench is to be inserted. As a result, the housing 2 can be easily fixed to the workbench by simply putting the pin provided on the workbench into the jig pin hole 82. Since the jig pin hole 82 is provided in the partition wall 8, it is not necessary to erect a column portion or the like for providing the jig pin hole 82 other than the partition wall 8. Accordingly, space can be saved.

According to the embodiment described above, the pin is to be inserted into the jig pin hole 82 provided in the partition wall 8 thereby reinforcing the partition wall 8. As a result, the wall-side locking portion 83 provided on the partition wall 8 can be prevented from deforming during assembly, and the misconnection between the wall-side locking portion 83 of the partition wall 8 and the block-side locking portion 112 of the block 11 can be prevented.

According to the embodiment described above, a part of the wall-side locking portion 83 is provided in the protruding portion 81 protruding in a thickness direction of the partition wall 8. As a result, the jig pin hole 82 and the wall-side locking portion 83 is provided adjacent to each other, and the deformation of the wall-side locking portion 83 during the assembly can be further prevented.

According to the embodiment described above, the jig pin hole 82 is provided in the protruding portion 81 protruding in a thickness direction of the partition wall 8. As a result, a pin having a thickness larger than the thickness of the partition wall 8 can be put into the jig pin hole 82.

According to the embodiment described above, the fitting component 12 is fitted to and held by the housing body 6 with the fitting component 12 being at a position above the block 11 in the upper-lower direction when the block 11 is accommodated in the housing body 6. The partition wall 8 is required to have a certain height in order to secure a space for accommodating the block 11 and the fitting component 12 which are disposed along the upper-lower direction, and therefore is likely to deform when the block 11 is assembled. According to the present embodiment, the jig pin hole 82 is provided in the partition wall 8 having such a height, so that the deformation of the partition wall 8 can be prevented, and the misconnection between the wall-side locking portion 83, provided on the partition wall 8, and the block 11 can be prevented.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to the embodiment described above, the wall-side locking portion 83 is provided on the partition wall 8. However, it is not necessarily required to provide the wall-side locking portion 83, and the jig pin hole 82 may be provided in the partition wall 8 on which the wall-side locking portion 83 is not provided.

According to the present embodiment, the jig pin hole 82 and the wall-side locking portion 83 are adjacent to each other, but the present invention is not limited thereto. The jig pin hole 82 and the wall-side locking portion 3 may be provided at separated positions.

According to the present embodiment, the protruding portion 81 protrudes on two sides of the partition wall 8 in the thickness direction, but the present invention is not limited thereto. The protruding portion 81 may protrude only from one side of the partition wall 8 in the thickness direction. In addition, the protruding portion 81 may not be provided if the partition wall 8 has a certain thickness.

According to the present embodiment, the fitting component 12 may be provided. However, the fitting component 12 is not necessarily required, and may not be provided.

According to an aspect of the embodiments described above, an electric junction box (1) includes a housing (2) configured to accommodate an electronic component (20) and a lid (3 to 5) configured to be attached to the housing (2) to cover an opening (66) of the housing (2). The housing (2) includes a housing body (6) configured to accommodate the electronic component (20), and a partition wall (8) dividing an inner space of the housing body (6). The partition wall (8) is provided with a jig pin hole (82) extending along a direction in which the lid (3 to 5) is attached to the housing (2), the jig pin hole (82) being configured such that a pin provided on a workbench is to be inserted into the jig pin hole (82) making the housing (2) fixed to the workbench on which another component is to be attached to the housing (2).

According to the electric junction box having the above-described configuration, the partition wall of the housing is provided with the jig pin hole which extends in a direction in which the lid is attached to the housing (attachment direction), the jig pin hole being configured such that a pin for attaching the housing to the workbench is to be inserted into the jig pin hole. As a result, the housing can be easily fixed to the workbench by simply putting the pin provided on the workbench into the jig pin hole. Since the jig pin hole is provided in the partition wall, it is not necessary to erect a column portion or the like for providing the jig pin hole therein separately from the partition wall. Accordingly, space can be saved. In addition, since the jig pin hole extends along the attachment direction in the partition wall, an opening of the jig pin hole can also be covered by the lid. Also, by virtue of the structure of the pin being inserted into the jig pin hole provided in the partition wall, the partition wall can be reinforced. As a result, the locking portion provided on the partition wall can be prevented from deforming during the assembly, and the misconnection between the locking portion and the block can be prevented.

The another component may include a block (11) to which the electronic component (20) is to be attached, the block (11) being configured to be locked to the housing body (6). The partition wall (8) may be provided with a locking portion (83) configured to be engaged with the block (11). The jig pin hole (82) and the locking portion (83) may be adjacent to each other.

With this configuration, the jig pin hole and the locking portion are adjacent to each other. As a result, the deformation of the locking portion during the assembly can be further prevented.

The partition wall (8) may be provided with a protruding portion (81) protruding in a thickness direction of the partition wall (8), the protruding portion (81) extending in the direction in which the lid (3 to 5) is attached to the housing (2). The jig pin hole (82) may be provided in the protruding portion (81).

With this configuration, the jig pin hole is provided in the protruding portion which protrudes in the thickness direction of the partition wall. Therefore, a pin having a thickness larger than the thickness of the partition wall can be inserted into the jig pin hole.

The another component may include a block (11) to which the electronic component (20) is to be attached, the block (11) being configured to be locked to the housing body (6). At least a part of a locking portion (83), the locking portion (83) being configured to be engaged with the block (11), may be provided in the protruding portion (81).

With this configuration, a part of the locking portion to be locked with the block is provided on the protruding portion which protrudes in the thickness direction of the partition wall. As a result, the deformation of the locking portion during the assembly can be further prevented.

The electric junction box (1) may further include a fitting component (12) to which the electronic component (20) and the electric wire (30) configured to be electrically connected to the electronic component (20) are attached. The fitting component (12) may be fitted to and held by the housing (2) at a position on one side of the block (11) in the direction in which the lid (3 to 5) is attached to the housing (2).

With this configuration, the fitting component is fitted to and held by the housing at a position on one side of the block in the attachment direction. The deformation of the partition wall having a certain height corresponding to the total height of the block and the fitting component can be prevented, and the misconnection between the locking portion and the block can be prevented.

What is claimed is:
1. An electric junction box comprising:
   a housing configured to accommodate an electronic component; and
   a lid configured to be attached to the housing to cover an opening of the housing,
   wherein the housing comprises: a housing body configured to accommodate the electronic component; and a partition wall dividing an inner space of the housing body, and
   wherein the partition wall is provided with a jig pin hole having a depth extending in a direction in which the lid is attached to the housing, the jig pin hole being configured such that a pin provided on a workbench is to be inserted into the jig pin hole affixing the housing to the workbench on which another component is to be attached to the housing.

2. The electric junction box according to claim 1, wherein the other component includes a block to which the electronic component is to be attached, the block being configured to be locked to the housing body, and wherein the partition wall is provided with a locking portion configured to be engaged with the block.

3. The electric junction box according to claim 2, wherein the jig pin hole and the locking portion are adjacent to each other.

4. The electric junction box according to claim 1, wherein the partition wall is provided with a protruding portion protruding in a thickness direction of the partition wall, the protruding portion extending in the direction in which the lid is attached to the housing, and wherein the jig pin hole is provided in the protruding portion.

5. The electric junction box according to claim 4, wherein the other component includes a block to which the electronic component is to be attached, the block being configured to be locked to the housing body, and wherein at least a part of a locking portion, the locking portion being configured to be engaged with the block, is provided in the protruding portion.

6. The electric junction box according to claim 2, further comprising:

a fitting component to which the electronic component and an electric wire configured to be electrically connected to the electronic component are attached, wherein the fitting component is fitted to and held by the housing at a position on one side of the block in the direction in which the lid is attached to the housing.

7. The electric junction box according to claim 1, wherein the lid includes an upper cover configured to cover one opening of the housing, and a lower cover configured to cover the other opening of the housing, and the jig pin hole is provided through the partition wall from the one opening of the housing to the other opening of the housing.

\* \* \* \* \*